United States Patent
Tomono

(10) Patent No.: US 9,552,086 B2
(45) Date of Patent: Jan. 24, 2017

(54) IMAGE PROCESSING DEVICE AND IMAGE PROCESSING SYSTEM

(71) Applicant: Keitaro Tomono, Nagoya (JP)

(72) Inventor: Keitaro Tomono, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 901 days.

(21) Appl. No.: 13/851,532

(22) Filed: Mar. 27, 2013

(65) Prior Publication Data

US 2013/0257771 A1 Oct. 3, 2013

(30) Foreign Application Priority Data

Mar. 30, 2012 (JP) ................................ 2012-082823

(51) Int. Cl.
*G06F 3/041* (2006.01)
*H04N 1/00* (2006.01)

(52) U.S. Cl.
CPC .......... *G06F 3/041* (2013.01); *H04N 1/00342* (2013.01); *H04N 1/00344* (2013.01);
(Continued)

(58) Field of Classification Search
None
See application file for complete search history.

(56) References Cited

U.S. PATENT DOCUMENTS

| 2006/0070011 A1 | 3/2006 | Matsuhara et al. |
| 2007/0190939 A1* | 8/2007 | Abel ..................... H04B 5/0031 455/41.2 |

(Continued)

FOREIGN PATENT DOCUMENTS

| JP | 2006-165785 A | 6/2006 |
| JP | 2011-186879 A | 9/2011 |

OTHER PUBLICATIONS

Japanese Patent Publicaiton No. JP 2011-186879 A, dated Sep. 22, 2011, together with English Abstract, and machine translation.
(Continued)

*Primary Examiner* — Maryam Ipakchi
(74) *Attorney, Agent, or Firm* — Scully, Scott, Murphy & Presser, P.C.

(57) ABSTRACT

An image processing device may include a display control module, an input module and a communication module. The display control module may be configured to cause a display unit to display a character string input screen. The input module may be configured to input a character string to the input item corresponding to the character string input screen displayed on the display unit. The communication module may be configured to communicate with an information processing terminal. The communication module may send item identification information to the information processing terminal and receive character string information from the information processing terminal. The display control module may display a character string based on the character string information in the character string input screen that corresponds to the input item identified by the item identification information, in a case where the communication module receives the item identification information and the character string information.

11 Claims, 10 Drawing Sheets

(52) U.S. Cl.
CPC ............... *H04N 2201/0075* (2013.01); *H04N 2201/0094* (2013.01)

(56) References Cited

U.S. PATENT DOCUMENTS

| | | | |
|---|---|---|---|
| 2010/0276484 A1* | 11/2010 | Banerjee | G06Q 30/06 235/379 |
| 2011/0047074 A1* | 2/2011 | Cai | G06Q 20/105 705/41 |
| 2011/0122067 A1 | 5/2011 | Okabayashi | |
| 2013/0215467 A1* | 8/2013 | Fein | G06F 3/1204 358/1.15 |
| 2014/0085663 A1* | 3/2014 | Kavanappillil | H04N 1/00342 358/1.15 |

OTHER PUBLICATIONS

Chinese Office Action dated Feb. 27, 2015 from related Chinese Application No. 201310102508.8, together with an English language translation.

* cited by examiner

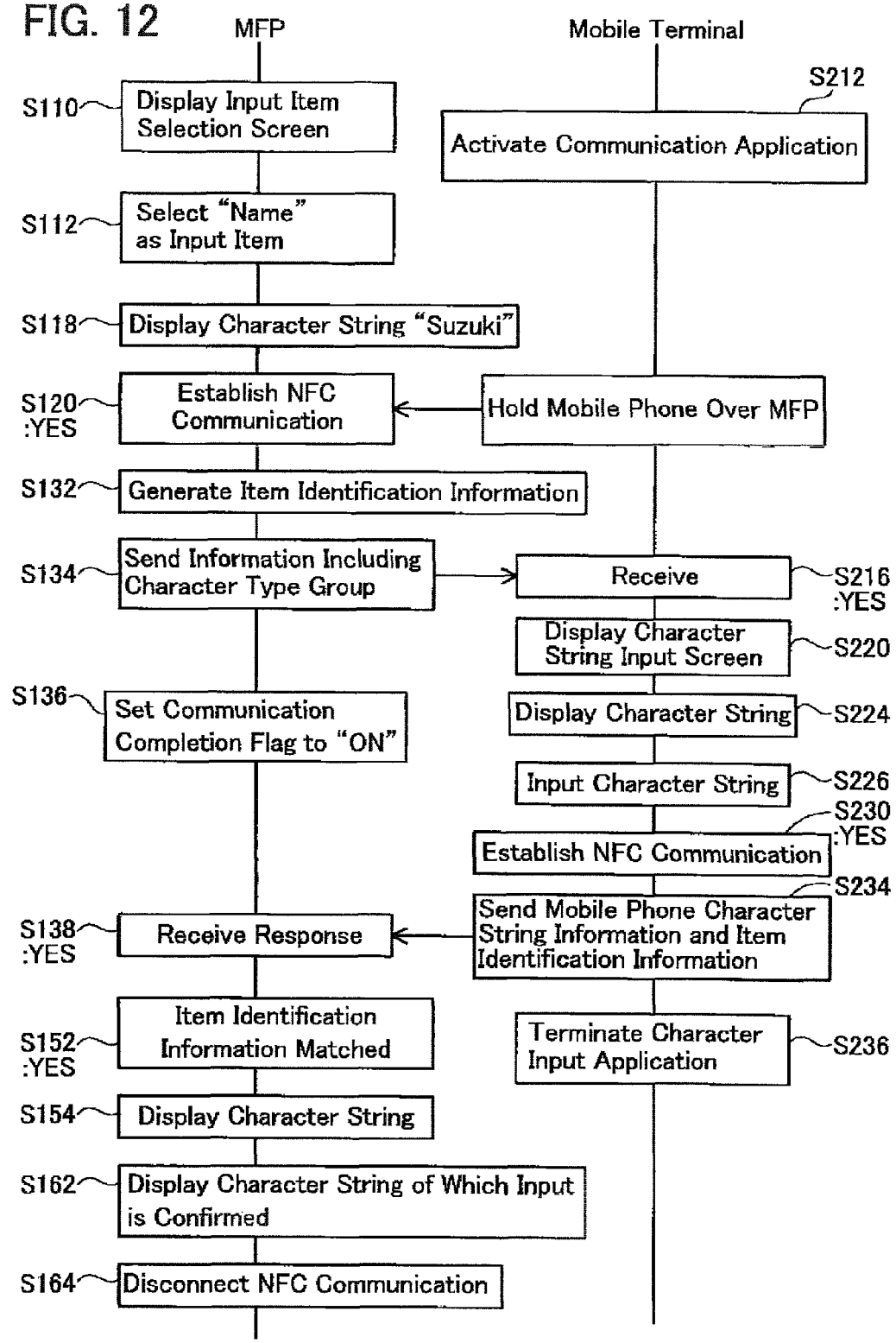

IMAGE PROCESSING DEVICE AND IMAGE PROCESSING SYSTEM

CROSS-REFERENCE TO RELATED APPLICATIONS

This application claims priority to Japanese Patent Application No. 2012-082823, filed on Mar. 30, 2012, the contents of which are hereby incorporated by reference into the present application.

TECHNICAL FIELD

Techniques disclosed in this Description relate to an image processing device, a computer program for an information processing terminal, and an image processing system that can improve character string input operability.

DESCRIPTION OF RELATED ART

In recent years, image processing devices (printers or the like) having a touch panel have become popular. Moreover, devices in which a keyboard is displayed on a touch panel to accept the input of a character string have become popular.

SUMMARY

The size of a touch panel has decreased with the request for cost reduction and miniaturization of the housing of an image processing device. In this case, since a character string is input using a keyboard displayed in a small touch panel, the size of each key decreases and the key space decreases. As a result, input operability deteriorates. This Description provides a technique capable of solving such a problem.

One technique disclosed in the present application is an image processing device. The image processing device may include a display control module and a communication module. The display control module may be configured to cause a display unit to display a character string input screen. The character string input screen may correspond to at least one input item among a plurality of input items. The communication module may be configured to communicate with an information processing terminal. The communication module may send item identification information to the information processing terminal and receive the item identification information and character string information from the information processing terminal. The item identification information may identify the input item corresponding to the character string input screen that is displayed by the display control module. The character string information may indicate a character string. The display control module may display the character string based on the character string information in the character string input screen that corresponds to the input item identified by the item identification information, in a case where the communication module receives the item identification information and the character string information.

Another technique disclosed in the present application is a non-transitory computer-readable storage medium storing a computer program for an information processing terminal including a communication unit. The computer program may include instructions for causing a processor of the information processing terminal to perform the steps of: accepting an input operation of a character string; and causing the communication unit to communicate with an image processing device. The causing of the communication unit to communicate with the image processing device may include causing the communication unit to receive specific input item information from the image processing device. The specific input item information may identify a input item that the image processing device accepts inputting. The accepting of the input operation of the character string may include accepting an input operation of character string information in response to receiving the specific input item information from the image processing device. The causing of the communication unit to communicate with the image processing device may further include causing the communication unit to send the specific input item information and the character string information to the image processing device after the input operation of the character string information is accepted.

Another technique disclosed in the present application is an image processing system. The image processing system may include an image processing device and an information processing terminal. The image processing device and the information processing terminal may be configured to connect with each other so as to communicate with each other. The image processing device may include a display control module and a first communication module. The display control module may be configured to cause a display unit to display a character string input screen. The first communication module may be configured to communicate with the information processing terminal. The information processing terminal may include a second input module and a second communication module. The second input module may be configured to accept an input operation of a character string. The second communication module may be configured to communicate with the image processing device. The first communication module of the image processing device may send input item identification information to the information processing terminal. The input item identification information may identify the input item corresponding to the character string input screen that is displayed by the display control module. The second input module of the information processing terminal may accept the input operation of the character string information in response to receiving the input item identification information from the image processing device. The second communication module of the information processing terminal may send the input item identification information and the character string information accepted by the input operation after the input operation of the character string information is accepted. The display control module of the image processing device may display the character string based on the character string information in the character string input screen that corresponds to the received input item identification information, in a case where the first communication module receives the input item identification information and the character string information.

BRIEF DESCRIPTION OF DRAWINGS

FIG. 12 is a sequence chart showing a specific example of the operation of a communication system 1.

EMBODIMENT

<Configuration of Communication System 1>

Figure 1:
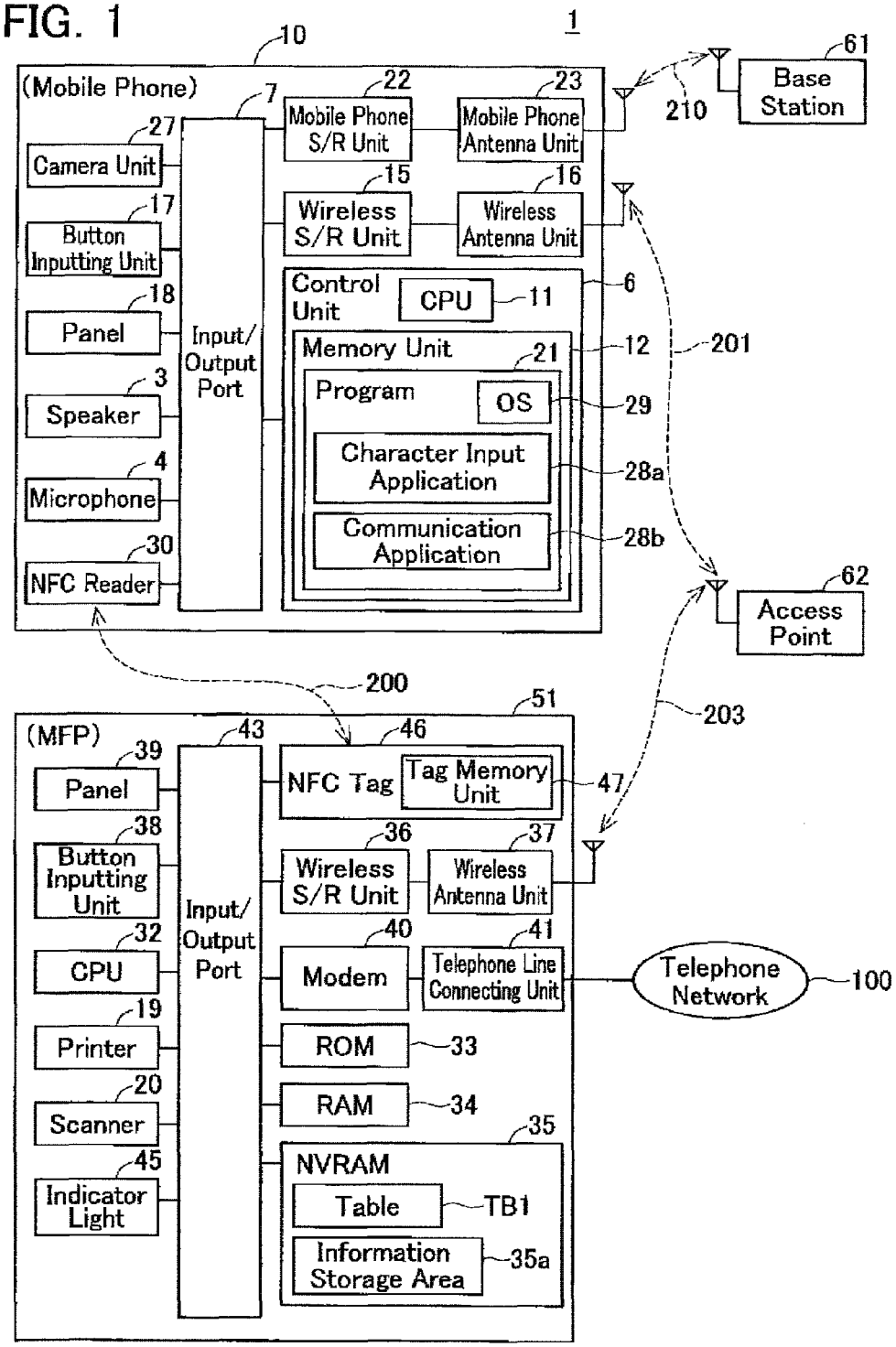
FIG. 1 is a block diagram of a communication system.

FIG. 1 shows a block diagram of a communication system 1 according to this embodiment. The communication system 1 includes a mobile phone 10, a multifunction peripheral (MFP) 51, an access point 62, and a base station 61. The mobile phone 10 and the MFP 51 have the function of an existing LAN terminal. Moreover, the MFP 51 has a communication function that uses a telephone network 100. The access point 62 has the function of an existing wireless LAN access point.

The MFP 51 is a multifunction peripheral that includes multiple functions. Examples of the multiple functions include a facsimile transmission function, a received facsimile viewing function, a scanning function, a printing function, and the like. The facsimile transmission function is a function of transmitting image data to an external device (not shown) via the telephone network 100. The received facsimile viewing function is a function of receiving image data from an external device (not shown) via the telephone network 100 and outputting the received image data. The scanning function is a function of scanning a document using a scanner 20 to generate image data. The printing function is a function of printing image data on a printing paper using a printer 19.

<Configuration of Mobile Phone 10>

The configuration of the mobile phone 10 will be described. As shown in FIG. 1, the mobile phone 10 includes a control unit 6, a wireless sending and receiving (S/R) unit 15, a wireless antenna unit 16, a button inputting unit 17, a panel 18, a mobile phone S/R unit 22, a mobile phone antenna unit 23, a camera unit 27, a near field communication (NFC) reader 30. Moreover, the mobile phone 10 includes a speaker 3 and a microphone 4 in order to make calls and input voice. These constituent components can communicate with each other via an input/output port 7.

The control unit 6 includes a central processing unit (CPU) 11 and a memory unit 12. The CPU 11 executes a program stored in the memory unit 12. The memory unit 12 includes a combination of a random access memory (RAM), a read only memory (ROM), a flash memory, a hard disk (HDD), a buffer included in the CPU 11, and the like. The memory unit 12 stores a program 21. The program 21 includes a character input application 28a, a communication application 28b, an operating system (OS) 29, and the like.

The character input application 28a is a program that implements a character input function. The character input application 28a is a program that can be used for general character input operations such as email composition, and is not limited to a case of inputting characters on an input item of an address book. The character input application 28a displays a character string input screen, for accepting the input of a character string, on the panel 18. A plurality of types of character string input screen is present depending on a character type of the input character string. For example, when the character type of the input character string is "Number," a character string input screen of a number pad corresponding to number is displayed. Moreover, for example, when the character type of the input character string is "English," a character string input screen of an alphabet keyboard corresponding to English is displayed. The character input application 28a may be provided in advance to the mobile phone 10.

The communication application 28b is a program that implements a character information communication process. The character information communication process is a process of communicating various types of information on character strings with the MFP 51 so that the MFP 51 can use the character strings input by the mobile phone 10. The character information communication process uses NFC communication 200. The detailed content of the character information communication process will be described later.

The OS 29 includes a program or the like for causing the mobile phone S/R unit 22 to execute a wireless communication 210, or a program or the like for causing the near field communication reader 30 to execute an NFC communication 200. Further, the OS 29 is also a program that provides an application programming interface (API) that allows each program to acquire information that is acquired by various items of hardware (e.g., the near field communication reader 30) or allows each program to issue instructions to various items of hardware.

The wireless S/R unit 15 performs a wireless LAN communication 201 pursuant to an infrastructure mode (a mode where a plurality of wireless LAN terminals performs data communication via an access point) according to a wireless LAN scheme (data communication scheme which uses radio waves) via the wireless antenna unit 16. Moreover, digital signals that constitute various types of data are sent and received by the wireless S/R unit 15. An example of the wireless LAN scheme includes a communication scheme that is defined by the IEEE 802.11a/b/g/n standards.

The NFC reader 30 performs the NFC communication 200 with an NFC tag 46. The NFC communication 200 is near-field wireless communication and is very short-range communication in which a communication area is within approximately 1 meter. The types of NFC communication include infrared communication and Bluetooth (registered trademark). Various items of information (IP addresses, SSIDs, and the like) for setting communication are not necessary for establishing the NFC communication 200. Moreover, the mobile phone S/R unit 22 performs the wireless communication 210 pursuant to a mobile phone communication scheme with the base station 61 via the mobile phone antenna unit 23.

The button inputting unit 17 is an operation module that accepts the operations of the user of the mobile phone 10. The button inputting unit 17 is integrated with the panel 18 as a touch panel. The panel 18 displays various items of functional information of the mobile phone 10. The camera unit 27 is a unit that captures an image of a predetermined range using CCDs or the like to acquire image data.

<Configuration of MFP 51>

The configuration of the MFP 51 will be described. The MFP 51 includes, as its main components, the printer 19, the scanner 20, a CPU 32, a read only memory (ROM) 33, a random access memory (RAM) 34, a nonvolatile RAM (NVRAM) 35, a wireless S/R unit 36, a wireless antenna unit 37, a button inputting unit 38, a panel 39, a modem 40, a telephone line connecting unit 41, the NFC tag 46, and an indicator light 45. These components can communication with each other via an input/output port 43.

The ROM 33 stores various types of programs. The CPU 32 executes the programs stored in the ROM 33. The RAM 34 is a volatile memory. The RAM 34 stores MFP input character string information, item identification information, and mobile phone character string information. The content of these items of information will be described later.

The NVRAM 35 is a nonvolatile memory. The NVRAM 35 stores a character information communication flag and a communication completion flag. The character information communication flag is a flag which is set "ON" when a character information communication process is executed and is set to "OFF" when the process is not executed. The communication completion flag is a flag which is "ON" when information (item identification information or the like) stored in a tag memory unit 47 has been transmitted to the mobile phone 10 via the NFC communication 200 and is "OFF" when the information has not been transmitted.

Figure 8:
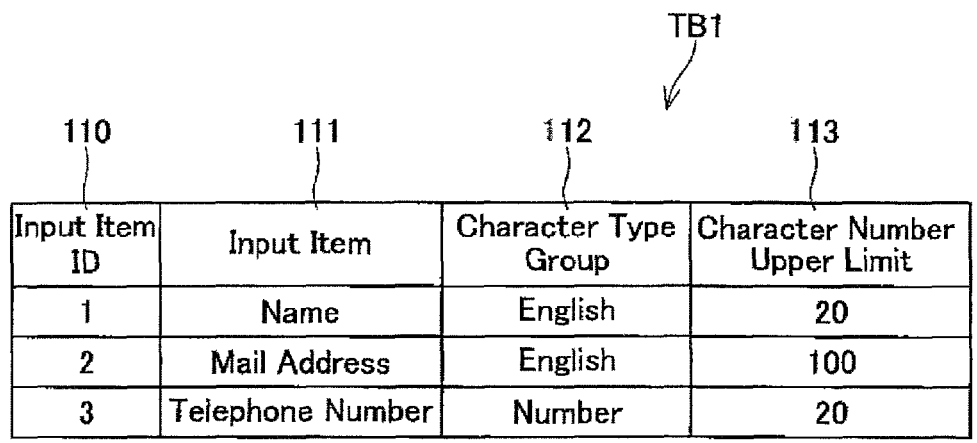
FIG. 8 is a diagram showing an example of a table.

Moreover, the NVRAM 35 stores a table TB1. The table TB1 is a table that stores various items of information for each of a plurality of input items. FIG. 8 shows an example of the table TB1 according to this embodiment. The table TB1 stores an input item ID 110, an input item 111, a character type group 112, and a character number upper limit 113.

The input item ID 110 is information for identifying various types of input items 111. The input item 111 is information that indicates an attribute of the information that is input. Examples of the input item 111 include Name, Mail Address, Telephone Number, and the like. The "Name" is the name of a person that is registered in an address book. The "Mail Address" is the mail address of a person that is registered in the address book. The "Telephone Number" is the telephone number of a person that is registered in the address book.

The character type group 112 is information that indicates a character type group that is available for the character string of the input item 111 among a plurality of character types. Examples of the character type group 112 include Japanese, Japanese Katakana, English, Number, and the like. Examples of the character types included in the character type group 112 (="Japanese") include Hiragana (Convertible), Katakana (Convertible), Alphabet, numbers, special characters, and the like. Examples of the character types included in the character type group 112 (="Japanese Katakana") include Katakana (Non-Convertible), Alphabet, numbers, special characters, and the like. Examples of the character types included in the character type group 112 (="English") include Upper-Case Alphabet, Lower-Case Alphabet, numbers, special characters, and the like. Examples of the character types included in the character type group 112 (="Number") include numbers and the like.

The character number upper limit 113 is information that indicates the upper limit of the number of characters that can be input when inputting information of the input item 111. The various items of information stored in the table TB1 may be stored in advance by the manufacturer of the MFP 51.

The example of the table TB1 of FIG. 8 shows that the input of information on name is accepted in the input item 111 corresponding to the input item ID 110 (="1"), the available character type group 112 is "English," and the number of characters (the character number upper limit 113) that is available when inputting a name is 20.

Moreover, the NVRAM 35 stores an information storage area 35a. The information storage area 35a is an area in which various items of information are stored. Examples of the information stored in the information storage area 35a include an address book. The address book is information in which the input item 111 (name, mail address, password, and telephone number) is stored in association with each of a plurality of persons.

The NFC tag 46 performs the NFC communication 200 with the NFC reader 30. The NFC tag 46 includes the tag memory unit 47. The tag memory unit 47 is a nonvolatile memory unit. The tag memory unit 47 is a memory unit for storing data that is sent from the NFC tag 46 to the NFC reader 30. The tag memory unit 47 stores the item identification information, the character type group 112, the MFP input character string information, the character number upper limit 113, and the like.

The item identification information is information for identifying the input item 111. The MFP input character string information is information that indicates the character string that is input by the MFP 51.

The wireless S/R unit 36 sends and receives digital signals that constitute various items of data by performing a wireless LAN communication 203 with the access point 62 via the wireless antenna unit 37. The wireless LAN communication 203 is communication in which a communication range is larger than that of the NFC communication 200. Moreover, a communication speed of the wireless LAN communication 203 is higher than a communication speed of the NFC communication 200.

The button inputting unit 38 includes keys for executing each function of the MFP 51. The button inputting unit 38 may be integrated with the panel 39 as a touch panel. The panel 39 displays various items of functional information of the MFP 51. The printer 19 is a unit that executes printing on a printing paper. The scanner 20 is a unit that scans a paper document to generate image data. The modem 40 modulates document data that is transmitted by the facsimile function into signals that can be transmitted to the telephone network 100 in order to transmit the signals via the telephone line connecting unit 41 and receives signals input from the telephone network 100 via the telephone line connecting unit 41 in order to demodulate the signals into document data. The indicator light 45 includes light emitting diodes (LEDs) or the like and is a unit that informs users of various statuses of the MFP 51.

The mobile phone 10 and the access point 62 can perform a wireless LAN communication 201 pursuant to the infrastructure mode of the wireless LAN scheme. Moreover, the MFP 51 and the access point 62 can perform a wireless LAN communication 203 pursuant to the infrastructure mode of the wireless LAN scheme. Thus, since the mobile phone 10 and the MFP 51 each can access the access point 62 to perform the wireless LAN communications 201 and 203 pursuant to the infrastructure mode of the wireless LAN scheme, data communication can be performed between the mobile phone 10 and the MFP 51.

Moreover, the mobile phone 10 and the MFP 51 can perform the NFC communication 200. Thus, since the mobile phone 10 and the MFP 51 can perform the NFC communication 200 when the mobile phone 10 is brought close to (is held over, for example) the MFP 51, various items of information can be communicated between the mobile phone 10 and the MFP 51.

<Operation of MFP>

Figure 2:
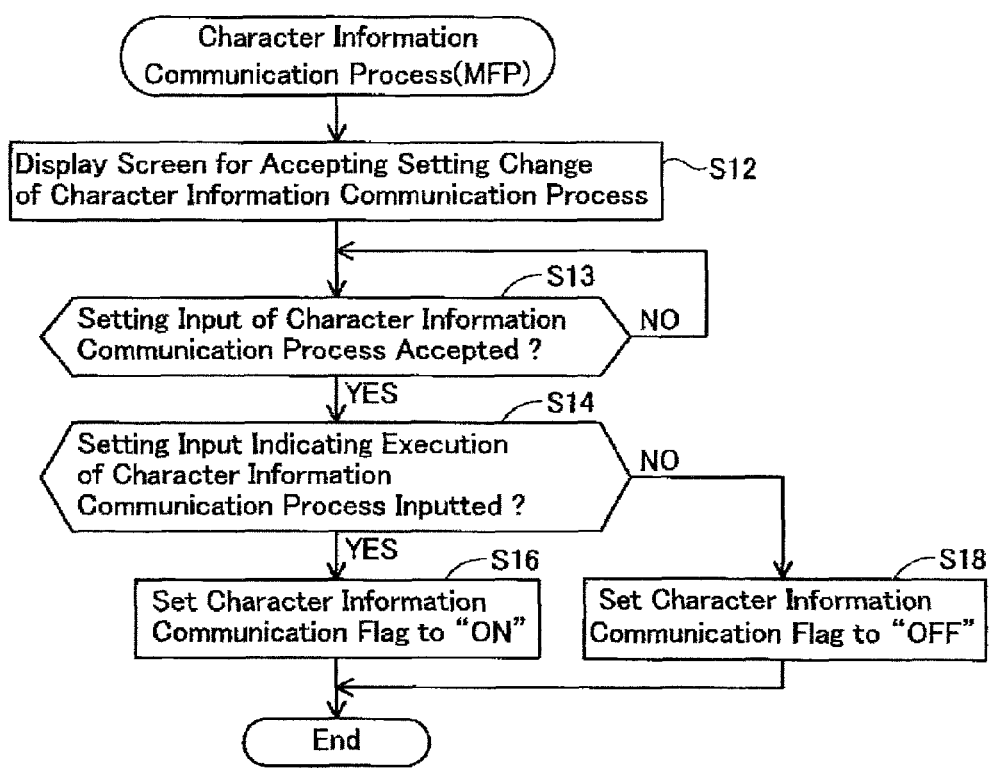
FIG. 2 is a flowchart for explaining a process of setting a character information communication process of an MFP.

A process of setting a character information communication process performed by the MFP 51 will be described with reference to FIG. 2. The flow of FIG. 2 starts when the MFP 51 enters into a state where the MFP 51 accepts the input of settings for a character information communication process. For example, a setting button for the character information communication process may be displayed on the panel 39, and the flow of FIG. 2 may start when the button is touched on.

In S12, the CPU 32 displays a screen for accepting the input of settings for the character information communication process on the panel 39. In S13, the CPU 32 judge whether the input of settings for the character information communication process is accepted. When the input of settings is not accepted (S13: NO), the flow returns to S13. When the input of settings is accepted (S13: YES), the flow proceeds to S14.

In S14, the CPU 32 judges whether the setting to execute the character information communication process is input. For example, a button ("Execute" button) for accepting the input of setting to execute the character information communication process and a button ("Do Not Execute" button) for accepting the input of setting to not execute the character information communication process may be displayed on the panel 39, and it may be judged which button is touched on. When the setting to execute the character information communication process is input (S14: YES), the flow proceeds to S16. In S16, the CPU 32 sets the character information communication flag stored in the NVRAM 35 to "ON." On the other hand, when the setting to not execute the character information communication process is input (S14: NO), the flow proceeds to S18. In S18, the CPU 32 sets the character information communication flag stored in the NVRAM 35 to "OFF." After that, the flow ends.

Figure 3:
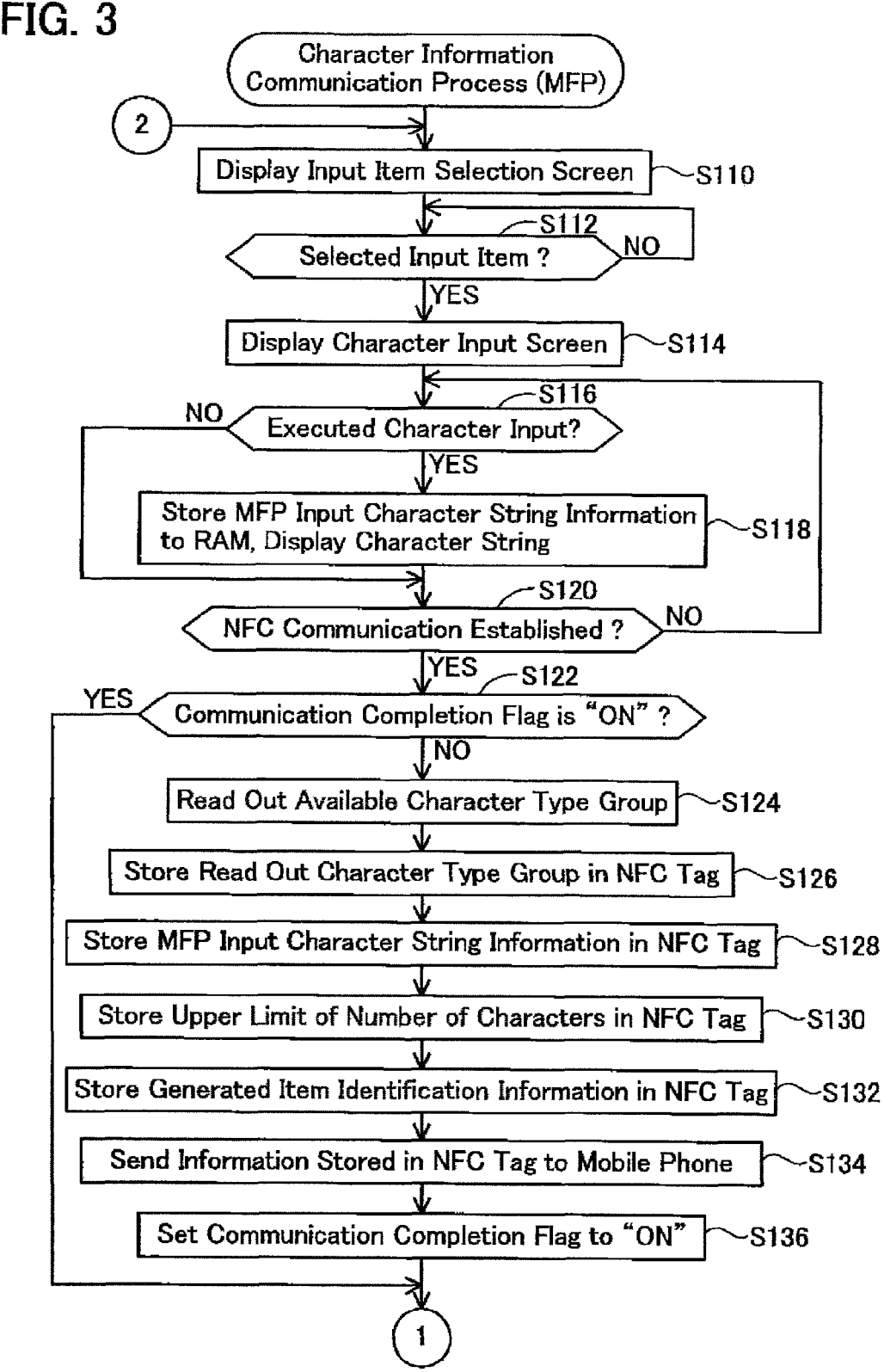
FIG. 3 is a flowchart for explaining the character information communication process of the MFP.
Figure 4:
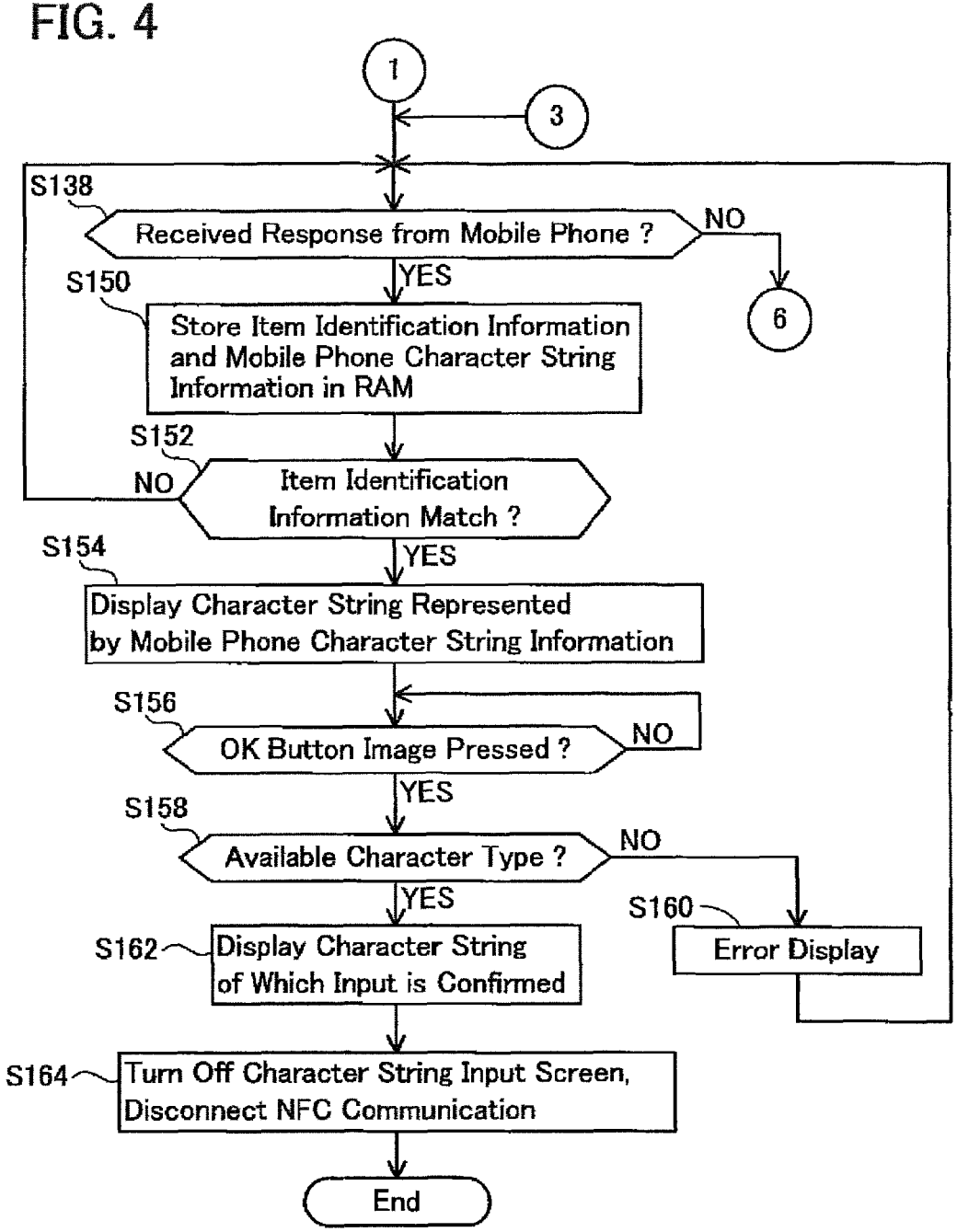
FIG. 4 is a flowchart for explaining the character information communication process of the MFP.
Figure 5:
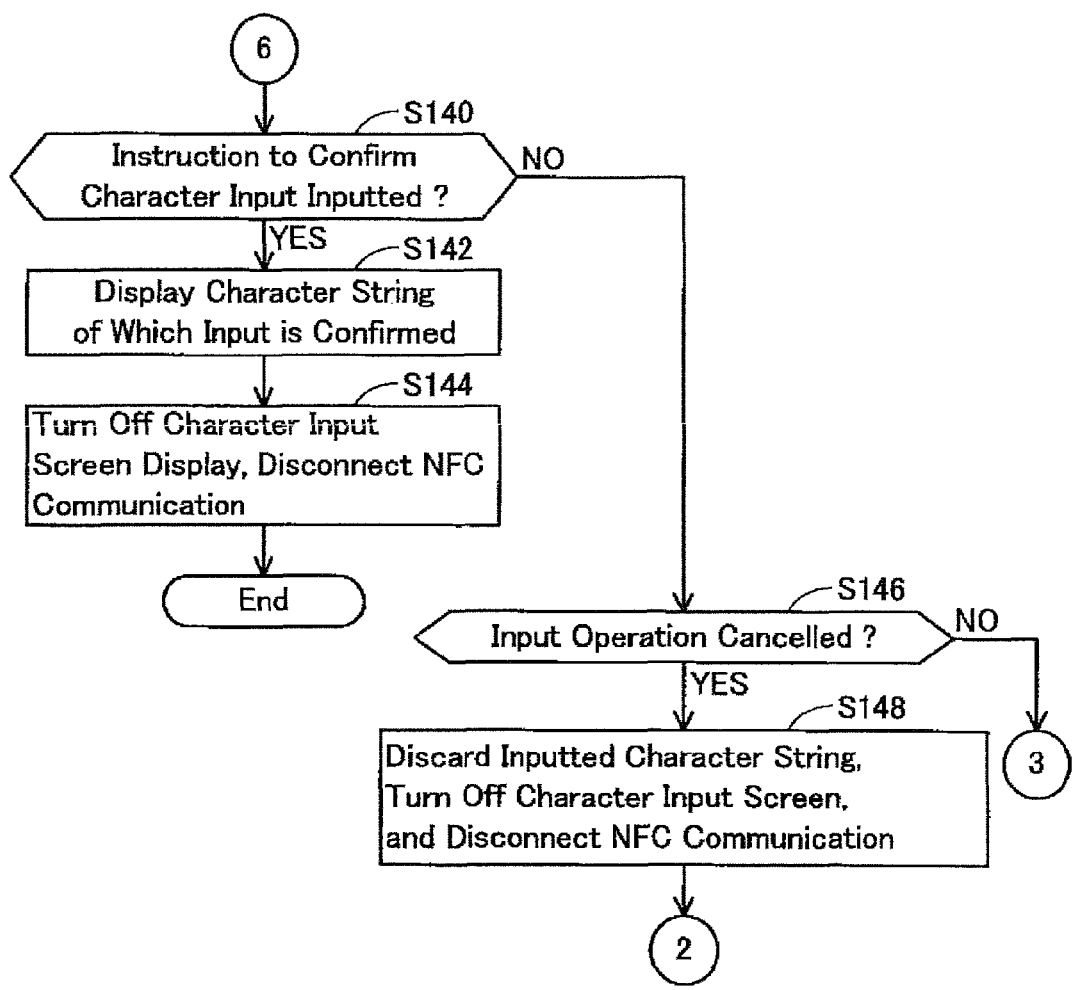
FIG. 5 is a flowchart for explaining the character information communication process of the MFP.

The character information communication process performed by the MFP 51 will be described with reference to FIGS. 3 to 5. The flow of FIGS. 3 to 5 is executed when the character information communication flag stored in the NVRAM 35 is "ON." In this embodiment, a process of storing information in an address book will be described as an example. The process of storing information in the address book starts when an instruction to store information in the address book is accepted. A button for adding information to the address book may be displayed on the panel 39, for example, and the instruction to store information in the address book may be accepted when the button is touched on.

Figure 9:
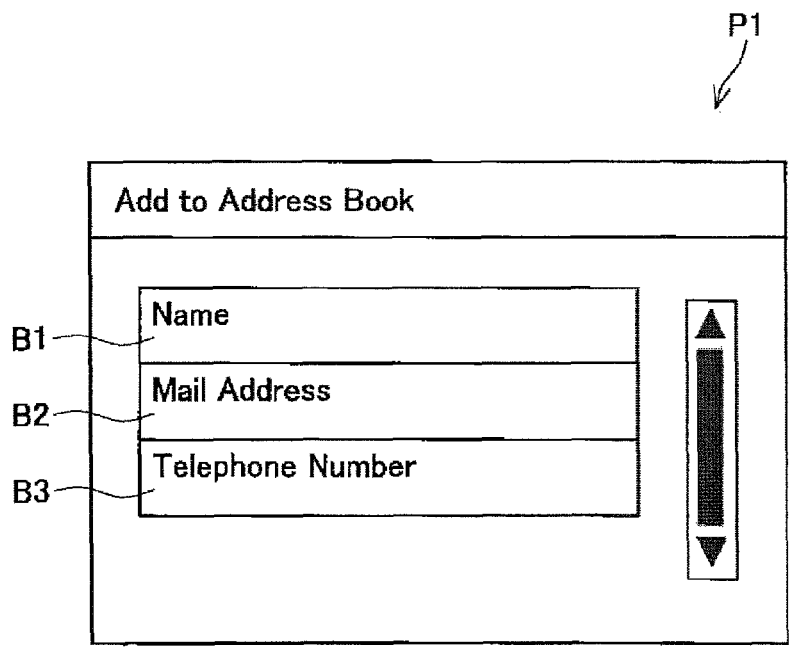
FIG. 9 is a diagram showing an example of an input item selection screen.

In S110, the CPU 32 displays an input item selection screen on the panel 39. The input item selection screen is a screen for accepting a selection of a type of the input item 111. FIG. 9 shows an input item selection screen P1 which is an example of the input item selection screen. The input item selection screen P1 is a screen that is displayed based on the table TB1 of FIG. 8. Input item button images B1 to B3 are displayed in the input item selection screen P1. The input item button image B1 is an image for accepting an operation of selecting the input item 111 of "Name." The input item button image B2 is an image for accepting an operation of selecting the input item 111 of "Mail Address." The input item button image B3 is an image for accepting an operation of selecting the input item 111 of "Telephone Number."

In S112, the CPU 32 judges whether the type of the input item 111 has been selected. The judgment on whether the type of the input item 111 has been selected may be made based on which of the input item button images B1 to B3 has been pressed. When the type of the input item is not selected (S112: NO), the flow returns to S112. When the type of the input item is selected (S112: YES), the flow returns to S114.

In this embodiment, a case where the input item 111 of "Name" is selected will be described as an example.

Figure 10:
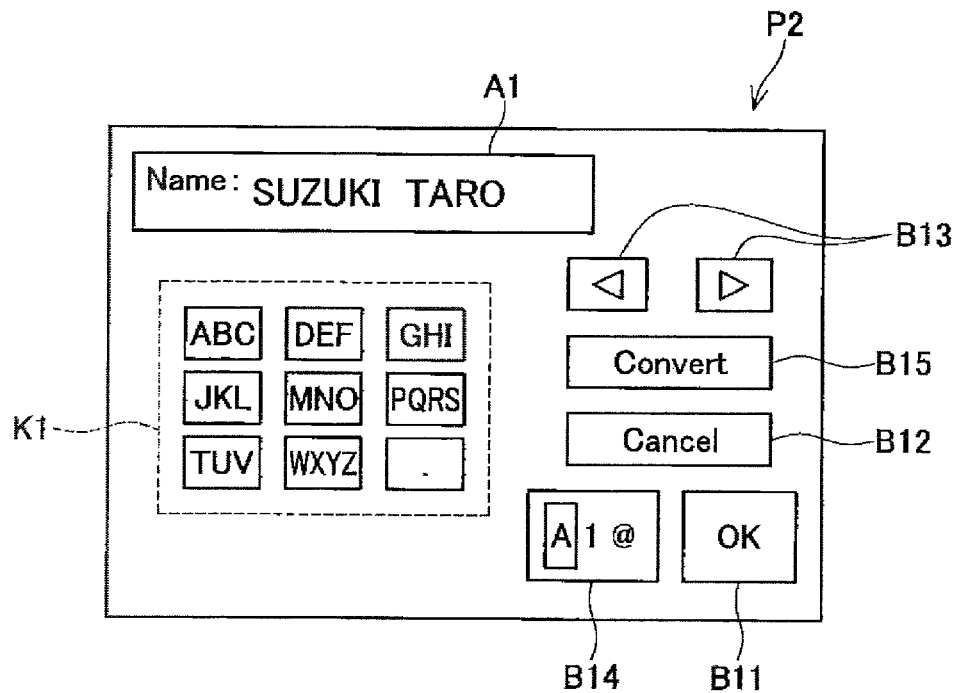
FIG. 10 is a diagram showing an example of a character string input screen.

In S114, the CPU 32 displays a character input screen corresponding to the selected input item 111 on the panel 39. FIG. 10 shows a character string input screen P2 which is an example of a character string input screen. The character string input screen P2 is a screen displayed when the input item 111 of "Name" is selected. A character string display area A1, a keyboard image K1, an OK button image B11, a "Cancel" button image B12, arrow button images B13, a character type change button image B14, a "Convert" button image B15, and the like are displayed in the character string input screen P2. Moreover, the name ("Name") of the selected input item 111 is displayed in the character string display area A1.

In S116, the CPU 32 judges whether a character corresponding to the selected input item 111 has been input. The character may be input using the keyboard image K1, the "Convert" button image B15, and the like. Moreover, since the character inputting process may be performed according to a commonly-used process, the description thereof will not be provided. When no character has been input (S116: NO), the flow proceeds to S120. When a character has been input (S116: YES), the flow proceeds to S118. In S118, the CPU 32 temporarily stores MFP input character string information, which is information that indicates an input character string, in the RAM 34. The MFP input character string information is information which uses a standard character code system (for example, Unicode). Moreover, the CPU 32 displays the input character string in the character string display area A1 of the character string input screen P2.

In S120, the CPU 32 judges whether the NFC communication 200 has been established. Specifically, the CPU 32 judges whether the NFC reader 30 provided in the mobile phone 10 has approached within a predetermined range around the NFC tag 46. The predetermined range may be approximately 10 cm, for example. When the NFC communication 200 is not established (S120: NO), the flow returns to S116. When the NFC communication 200 is established (S120: YES), the flow proceeds to S122.

In S122, the CPU 32 judges whether the communication completion flag stored in the NVRAM 35 is "ON." When the communication completion flag is "ON" (S122: YES), the flow proceeds to S138 (FIG. 4). When the communication completion flag is not "ON" (S122: NO), the flow proceeds to S124.

In S124, the CPU 32 reads the character type group 112 that is available for the selected input item 111 from the table TB1. In the example of this embodiment, since the case where "Name" is selected as the input item 111 is described, the character type group 112 (="English") is read from the table TB1.

In S126, the CPU 32 stores the character type group 112 read in S124 in the tag memory unit 47 of the NFC tag 46. Due to this, in S134 described later, the character type group 112 can be sent to the mobile phone 10. In the example of this embodiment, the character type group 112 (="English") is stored in the tag memory unit 47.

In S128, when characters have been input in S118, the CPU 32 stores the MFP input character string information, which is information that indicates the input character string, in the tag memory unit 47 of the NFC tag 46. Due to this, in S134 described later, the MFP input character string information can be sent to the mobile phone 10.

In S130, the CPU 32 reads the character number upper limit 113 which is the upper limit of the number of characters that is available for the selected input item 111 from the table TB1, and stores the character number upper limit 113 in the tag memory unit 47 of the NFC tag 46. Due to this, in S134 described later, the character number upper limit 113 can be sent to the mobile phone 10. In the example of this embodiment, since the case where "Name" is selected as the input item 111 is described, the character number upper limit 113 (="20") is stored in the tag memory unit 47.

In S132, the CPU 32 generates item identification information for identifying the selected input item 111. The item identification information may be generated by generating a 4-digit random number, for example. Moreover, the CPU 32 stores the generated item identification information in the tag memory unit 47 of the NFC tag 46. Due to this, in S134 described later, the item identification information can be sent to the mobile phone 10. In the example of this embodiment, the item identification information for identifying that the input item 111 is "Name" is generated and stored in the tag memory unit 47.

In S134, the CPU 32 sends the information, stored in the tag memory unit 47 of the NFC tag 46, to the mobile phone 10 using the NFC communication 200. As a result, the character type group 112, the character number upper limit 113, and the item identification information are sent to the mobile phone 10. When characters have been input in S118, the MFP input character string information is also sent too the mobile phone 10. In S136, the CPU 32 sets the communication completion flag stored in the NVRAM 35 to "ON."

In S138 (FIG. 4), the CPU 32 judges whether a response is received from the mobile phone 10 via the NFC communication 200. When a response is not received from the mobile phone 10 (S138: NO), the flow proceeds to S140 (FIG. 5).

In S140, the CPU 32 judges whether an instruction to confirm the input characters is input. For example, a "Confirm" button for accepting the input of an instruction to confirm the character string (S116) that has been input using the button inputting unit 38 of the MFP 51 may be displayed on the panel 39. Moreover, the instruction to confirm the input characters may be input when the "Confirm" button is touched on. When the instruction to confirm the input characters is input (S140: YES), the flow proceeds to S142. In S142, the CPU 32 stores the MFP input character string information, stored temporarily in the RAM 34 in S118, in the information storage area 35a of the NVRAM 35. As a result, a state is created where the character string, the input of which is confirmed, (a character string based on the MFP input character string information) is displayed in the character string display area A1. Moreover, the process of inputting the character string, based on the MFP input character string information, in the address book is completed. In S144, the CPU 32 turns off the character input screen from the panel 39 and disconnects the NFC communication 200. After that, the flow ends.

On the other hand, when it is judged in S140 that the instruction to confirm the input characters is not input (S140: NO), the flow proceeds to S146. In S146, the CPU 32 judges whether an instruction, to cancel the operation of inputting a character string to the input item 111, is input. For example, a button for canceling the input of a character string may be displayed on the panel 39 together with the "Confirm" button described above. Moreover, the instruction to cancel the operation of inputting a character string may be input when the cancel button is touched on. When the operation of inputting a character string is not canceled (S146: NO), the flow returns to S138. When the operation is canceled (S146: YES), the flow proceeds to S148. In S148, the CPU 32 erases the information of the character string (the character string input in S118) which is accepted by the MFP 51. As a result, the character string input in S118 is discarded. Moreover, the CPU 32 turns off the character input screen from the panel 39 and disconnects the NFC communication 200. After that, the flow returns to S110 (FIG. 3).

Moreover, when it is determined in S138 (FIG. 4) that a response is received from the mobile phone 10 (S138: YES), the flow proceeds to S150. In S150, the CPU 32 temporarily stores the information (item identification information and mobile phone character string information), received from the mobile phone 10, in the RAM 34. The mobile phone character string information is information that indicates the character string input by the mobile phone 10. The mobile phone character string information is information which uses a standard character code system (for example, Unicode).

In S152, the CPU 32 judges whether the item identification information sent to the mobile phone 10 in S134 is identical to the item identification information received from the mobile phone 10 in S150. When both items of information are not identical (S152: NO), the flow returns to S138. When both items of information are identical (S152: YES), the flow proceeds to S154.

In S154, the CPU 32 displays a character string, represented by the mobile phone character string information that is received from the mobile phone 10, in the character string display area A1 of the character string input screen P2 (FIG. 10). As a result, the character string input by the mobile phone 10 is displayed in the character string display area of the MFP 51.

In S156, the CPU 32 judges whether the OK button image B11 of the character string input screen P2 (FIG. 10) is pressed. When the OK button image B11 is not pressed (S156: NO), the flow returns to S156. When the OK button image is pressed (S156: YES), the flow proceeds to S158. In S158, the CPU 32 judges whether the character type of the character string represented by the mobile phone character string information is included in the character type group 112 that is available for the selected input item 111. In the example of this embodiment, it is judged whether the character type of the character string represented by the mobile phone character string information is included in the character type group 112 ("English") that is available for the input item 111 ("Name"). When the character type is not included (S158: NO), the flow proceeds to S160 and the CPU 32 displays an error message on the panel 39 indicating that the character type is different. After that, the flow returns to S138. On the other hand, when the character type is included (S158: YES), the flow proceeds to S162.

In S162, the CPU 32 stores the mobile phone character string information, stored temporarily in the RAM 34 in S150, in the information storage area 35a of the NVRAM 35. As a result, a state is created where the character string, the input of which is confirmed, (the character string based on the mobile phone character string information) is displayed in the character string display area A1. Moreover, the process of inputting the character string based on the mobile phone character string information in the address book is completed.

In S164, the CPU 32 turns off the character string input screen from the panel 39 and disconnects the NFC communication 200. After that, the flow ends.

<Operation of Mobile Phone 10>

Figure 6:
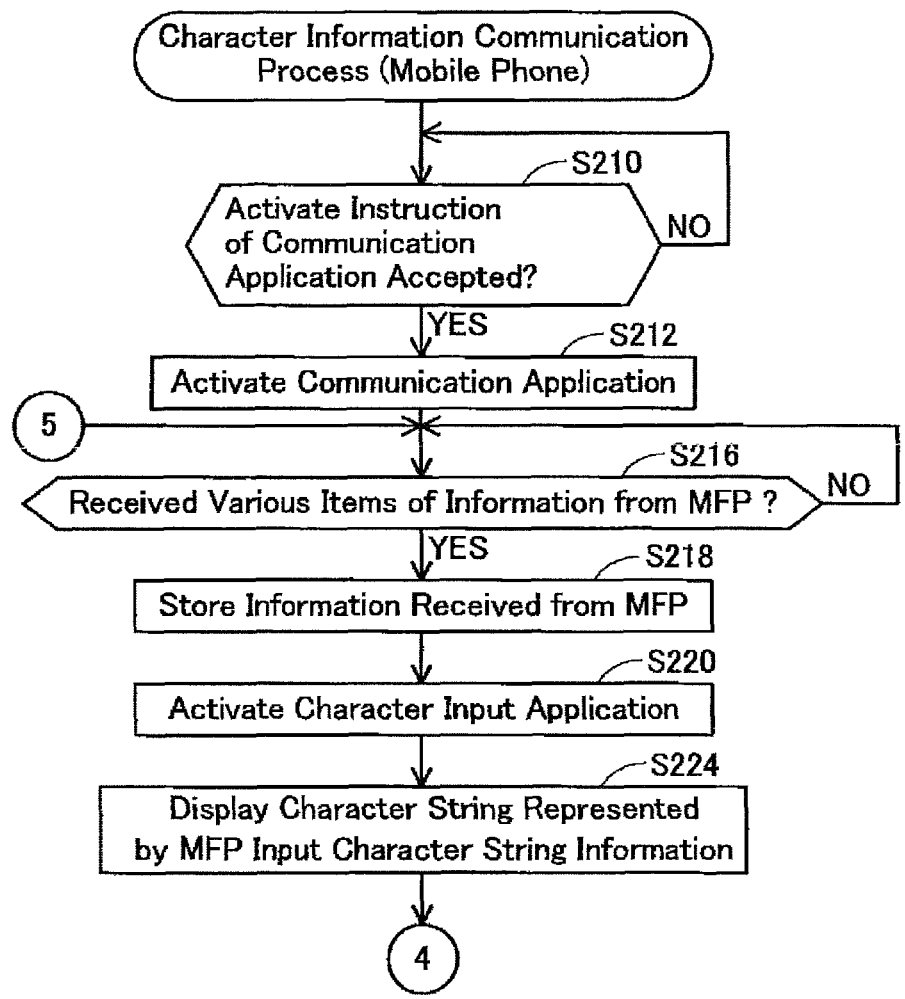
FIG. 6 is a flowchart for explaining a character information communication process of a mobile phone.
Figure 7:
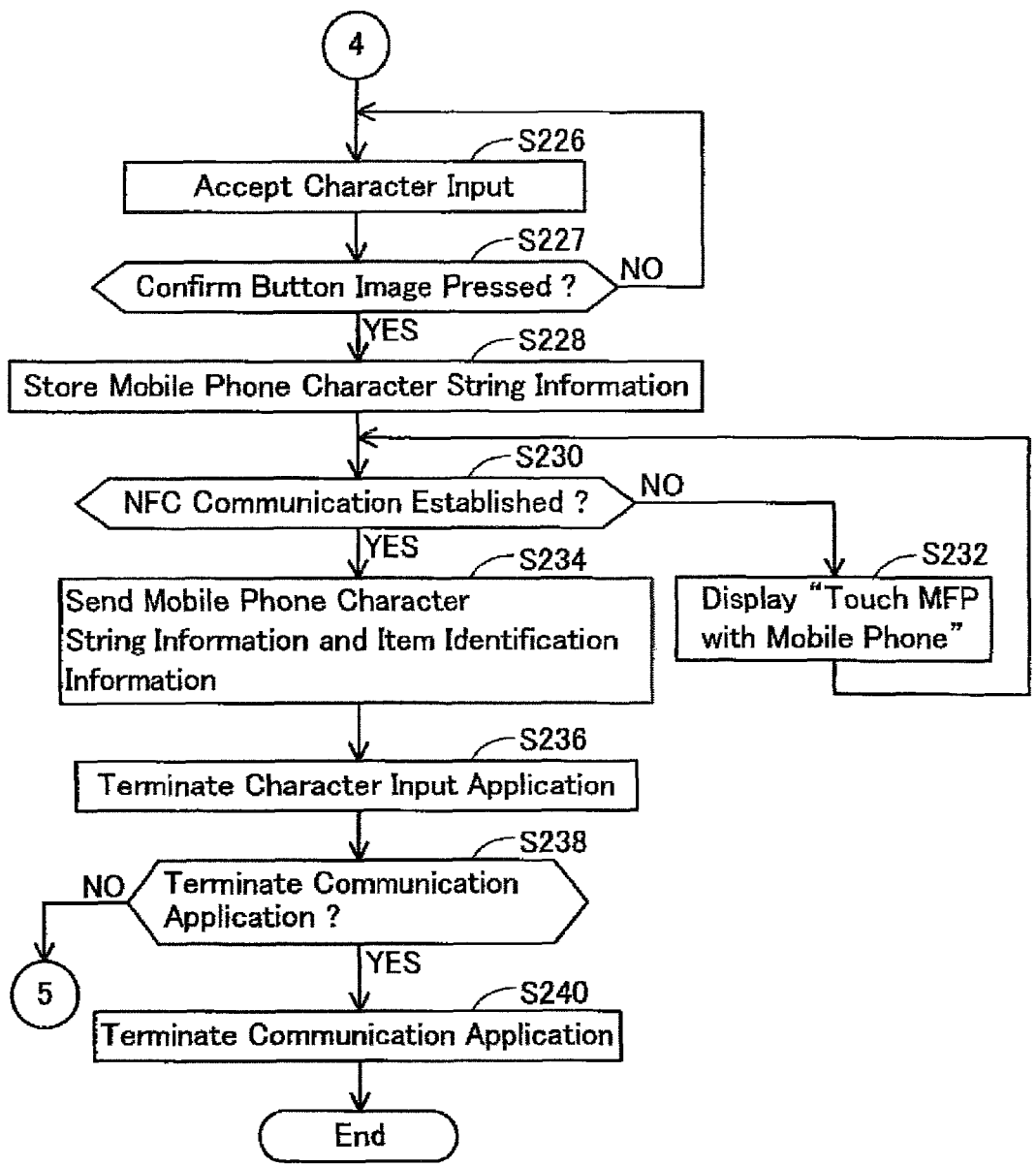
FIG. 7 is a flowchart for explaining the character information communication process of the mobile phone.

The character information communication process performed by the mobile phone 10 will be described with reference to FIGS. 6 and 7. The flow of FIGS. 6 and 7 starts when the CPU 11 activates the character input application 28a. In S210, the CPU 11 judges whether an instruction to activate the communication application 28b has been accepted. For example, a button for activating the communication application 28b may be displayed on the panel 18, and the activation instruction may be accepted when the activation button is touched on. When the activation instruction is not accepted (S210: NO), the flow returns to S210. When the activation instruction is accepted (S210: YES), the flow proceeds to S212. In S212, the CPU 11 activates the communication application 28b. Moreover, the CPU 11 monitors execution of the NFC communication 200.

In S216, the CPU 11 judges whether various items of information such as the character type group 112, the character number upper limit 113, and the item identification information have been received from the MFP 51. Specifically, it is judged whether the information sent from the NFC tag 46 via the NFC communication 200 has been received by the NFC reader 30. When the information is not received (S216: NO), the flow returns to S216. When the information is received (S216: YES), the flow proceeds to S218. In S218, the CPU 11 stores the information received from the MFP 51 in the memory unit 12.

Figure 11:
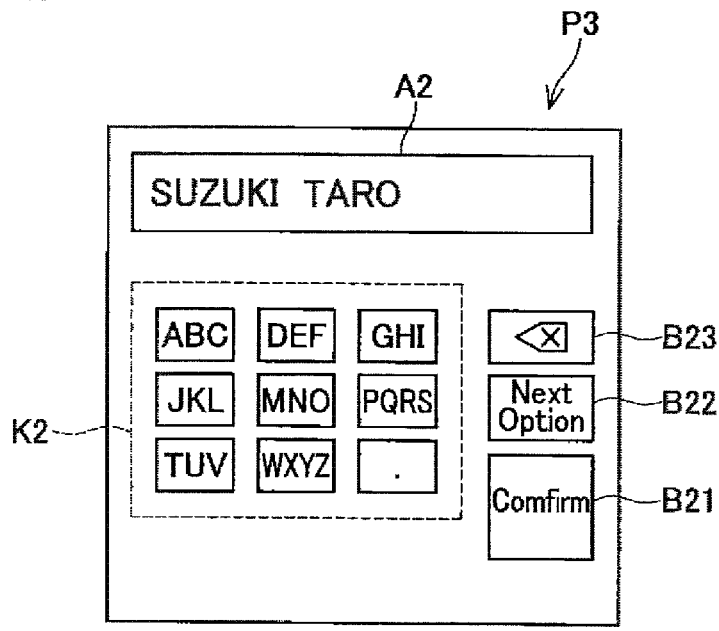
FIG. 11 is a diagram showing an example of the character string input screen.

In S220, the CPU 11 activates the character input application 28a. As a result, the character string input screen is displayed on the panel 18 of the mobile phone 10. Moreover, the character type corresponding to the character string input screen is set to be the same as the character type included in the character type group 112 that is received from the MFP 51. FIG. 11 shows a character string input screen P3 which is an example of the character string input screen. The character string input screen P3 is a screen that corresponds to a character type (="Upper-Case Alphabet") included in the character type group 112 (="English"). A character string display area A2, a keyboard image K2, a "Confirm" button image B21, a "Next Option" button image B22, a Backspace button image B23, and the like are displayed in the character string input screen P3. In this embodiment, a case where the character string input screen P3 is displayed on the panel 18 of the mobile phone 10 will be described as an example.

In S224, when it is judged in S216 that the MFP input character string information is received, the CPU 11 displays the character string represented by the MFP input character string information in the character string display area A2 of the character string input screen P3. Due to this, a continuation of the character string that is input halfway on the MFP 51 side can be input using the mobile phone 10.

In S226 (FIG. 7), the CPU 11 accepts the characters input by the user. Moreover, the CPU 11 displays the input character string in the character string display area A2. The number of characters accepted in S226 is within the range of an upper limit that is designated by the character number upper limit 113 received in S218. The characters may be input using the keyboard image K2, the "Next Option" button image B22, and the like. Moreover, since the character inputting process may be performed according to a commonly-used process, the description thereof will not be provided.

In S227, the CPU 11 judges whether the "Confirm" button image B21 of the character string input screen P3 is pressed. When the button is not pressed (S227: NO), the flow returns to S226. When the button is pressed (S227: YES), the flow proceeds to S228. In S228, the CPU 11 stores the character string (the mobile phone character string information), which has been displayed in the character string display area A2 at a time when the "Confirm" button image B21 is pressed, in the memory unit 12. As a result, the input of the character string by the mobile phone 10 is confirmed.

In S230, the CPU 11 judges whether the NFC communication 200 with the MFP 51 has been established. Specifically, the CPU 11 judges whether the NFC reader 30 of the mobile phone 10 has approached within a predetermined range around the NFC tag 46 of the MFP 51. When the NFC communication 200 is not established (S230: NO), the flow proceeds to S232. In S232, the CPU 11 displays a message on the panel 18, instructing to touch the MFP 51 with the mobile phone 10. After that, the flow returns to S230.

On the other hand, when it is judged in S230 that the NFC communication 200 is established (S230: YES), the flow proceeds to S234. In S234, the CPU 11 sends the mobile phone character string information (confirmed in S228) and the item identification information (received in S218) to the MFP 51 using the NFC communication 200.

In S236, the CPU 11 terminates the character input application 28a. As a result, the display of the character string input screen P3 is turned off. In S238, the CPU 11 judges whether an instruction to terminate the communication application 28b is accepted. For example, a button for terminating the communication application 28b may be displayed on the panel 18, and the termination instruction may be accepted when the termination button is touched on. When the termination instruction is not accepted (S238: NO), the flow returns to S216 (FIG. 6). When the termination instruction is accepted (S238: YES), the flow proceeds to S240. In S240, the CPU 11 terminates the communication application 28b. As a result, monitoring of the NFC communication 200 ends. After that, the flow ends.

<Specific Example of Operation>

A specific example of the operation of the communication system 1 according to this embodiment will be described with reference to the sequence chart of FIG. 12. In FIG. 12, a case where the input item 111 of "Name" is selected will be described as an example. Moreover, a case where the character information communication flag stored in the NVRAM 35 is set to "ON" will be described.

When the user presses a button for adding information to an address book on the panel 39 of the MFP 51, the input item selection screen P1 (FIG. 9) is displayed on the panel 39 (S110). When the user presses the input item button image B1, "Name" is selected as the input item 111 (S112), and the character string input screen P2 (FIG. 10) is displayed on the panel 39 (S114). When the user operates the keyboard image K1 to input a character string of "SUZUKI," the character string of "SUZUKI" is displayed on the character string display area A1 (S118).

When the user touches on a button for activating the communication application 28b on the panel 18 of the mobile phone 10, the communication application 28b is activated (S212). When the user holds the mobile phone 10 over the MFP 51, the NFC communication 200 is established (S120: YES). Item identification information (="5812") which is a 4-digit random number is generated (S132). The character type group 112 (="English), the character number upper limit 113 (="20"), the item identification information (="5812"), and the MFP input character string information (="SUZUKI") are sent to the mobile phone 10 via the NFC communication 200 (S134). Moreover, the communication completion flag is set to "ON" (S136).

When various items of information sent from the MFP 51 are received by the mobile phone 10 (S216: YES), the character input application 28a is activated, and the character string input screen P3 (FIG. 11) is displayed on the panel 18 (S220). The character string (SUZUKI) represented by the MFP input character string information is displayed in the character string display area A2 of the character string input screen P3 (S224). When the user operates the keyboard image K2 or the like to input a character string of "TARO," a state where a character string of "SUZUKI TARO" is displayed in the character string display area A1 is created (S226). When the user presses the "Confirm" button image B21 (S227: YES) and holds the mobile phone 10 over the MFP 51 again, the NFC communication 200 is established (S230: YES). The mobile phone character string information (="SUZUKI TARO") and the item identification information (="5812") are sent to the MFP 51 via the NFC communication 200 (S234). Moreover, the character input application 28a is terminated (S236).

When the MFP 51 receives a response from the mobile phone 10 (S138: YES), the mobile phone character string information (="SUZUKI TARO") and the item identification information (="5812") are temporarily stored in the RAM 34 (S150). Since the item identification information (="5812") (S134) sent to the mobile phone 10 is identical to the item identification information (="5812") (S150) received from the mobile phone 10 (S152: YES), the character string (SUZUKI TARO) represented by the mobile phone character string information is displayed in the character string display area A1 of the character string input screen P2 (FIG. 10) (S154). Since the character type of the character string (SUZUKI TARO) represented by the mobile phone character string information is included in the character type group 112 (="English") that is available for the input item 111 (="Name") (S158: YES), a state is created where the character string, the input of which is confirmed, (="SUZUKI TARO") is displayed in the character string display area A1 (S162). The character string input screen P2 is turned off from the panel 39, and the NFC communication 200 is disconnected (S164).

<Advantages>

Advantages of the communication system 1 according to the example of this embodiment will be described. In the technique disclosed in this Description, the mobile phone 10 can be used as an input module for inputting a character string to the MFP 51. Since the size of the panel 18 of the mobile phone 10 is larger than the size of the panel 39 of the MFP 51, it is possible to increase the displayed keyboard image for accepting the input of character strings and to improve character input operability.

In the technique disclosed in this Description, the general-purpose character input application 28a that is already mounted on the mobile phone 10 can be used as an application for inputting a character string to the MFP 51. Thus, it is possible to eliminate the need to provide the mobile phone 10 with a special-purpose character input application for inputting a character string to the MFP 51.

In the technique disclosed in this Description, character string information is communicated between the MFP 51 and the mobile phone 10 using the standard character code system (for example, Unicode). Due to this, it is possible to deal with various kinds of character input applications and to eliminate the dependence on the model of the mobile phone 10. Moreover, since the size of the character string information can be decreased, it is possible to communicate the character string information using the NFC communication 200 which provides a lower transmission rate than a wireless LAN or the like.

In the technique disclosed in this Description, using the establishment of the NFC communication 200 with the mobile phone 10 as a trigger (S120: YES), the item identification information and the like can be sent to the mobile phone 10 (S134). Thus, it is possible to eliminate the operation for sending the item identification information and the like to the mobile phone 10 and to improve the user convenience.

In the technique disclosed in this Description, by sending the character type group 112 to the mobile phone 10 (S126 and S134), the mobile phone 10 can be informed of the character type that the MFP 51 accepts. Due to this, the character input application, for inputting the character type that the MFP 51 accepts, can be activated by the mobile phone 10 (S220). Thus, since the user of the mobile phone 10 does not need to perform the operation for selecting the same character type as the character type that the MFP 51 accepts, it is possible to improve the user convenience.

In the technique disclosed in this Description, by sending the MFP input character string information to the mobile phone 10 (S128 and S134), it is possible to display the character string input by the MFP 51 on the mobile phone 10 (S224). Due to this, since a continuation of the character string that is input halfway on the MFP 51 side can be input using the mobile phone 10, it is possible to improve the input operability.

In the technique disclosed in this Description, when the character type of the character string represented by the mobile phone character string information that is received from the mobile phone 10 is the character type that is available for the selected input item 111 (S158: YES), the process of displaying the character string represented by the mobile phone character string information in the character string display area is completed (S162). Due to this, it is possible to prevent the occurrence of a situation in which a received character string is displayed in the character string display area, when the character string of the character type that is not accepted for the selected input item 111 is received from the mobile phone 10.

In the technique disclosed in this Description, when the mobile phone character string information for an input item that is different from the selected input item is received from the mobile phone 10 (S152: NO), the character string represented by the mobile phone character string information can be controlled so as not to be displayed in the character string display area. Due to this, it is possible to prevent the occurrence of a situation in which the received character string is displayed in an incorrect input item.

In the technique disclosed in this Description, the input of a character string that is accepted by the mobile phone 10 can be limited to fall within the range of a character number upper limit (S226). Thus, it is possible to prevent the occurrence of a situation in which a character string having a number of characters exceeding the upper limit is sent from the mobile phone 10.

In the technique disclosed in this Description, the NFC communication 200 is used for the communication between the MFP 51 and the mobile phone 10. Due to this, by bringing the mobile phone 10 so as to approach the MFP 51, the approached MFP 51 can be selected as a character input target MFP 51. That is, even when there is a plurality of MFPs 51, it is possible to identify the character input target MFP 51 using a communication module. Thus, it is possible to intuitively select a character input target MFP 51.

In the technique disclosed in this Description, the NFC communication 200 is used for the communication between the MFP 51 and the mobile phone 10. Thus, since it is not necessary to perform communication setting when initiating communication between the MFP 51 and the mobile phone 10, it is possible to select the character input target MFP 51 with a simple operation of bringing the mobile phone 10 close to the MFP 51.

When the item identification information for identifying each input item is allocated in advance to each input item, the size of the item identification information increases as the number of input items increases. For example, in an address book, when the input item is identified for each registered person, the item identification information required has a larger size as the number of registered person increases. In the technique disclosed in this Description, item identification information (random number) is generated whenever communication is executed (S132). Due to this, it is possible to eliminate the process of allocating item identification information in advance to each input item. Thus, it is possible to prevent the occurrence of a situation in which the size of the item identification information increases even when there is a number of input items.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modifications>

The character string input screen P2 shown in FIG. 10 is an example of a display screen, and another display mode may be used. For example, the name ("Name") of the selected input item 111 may be not displayed in the character string display area A1. Further, a plurality of input items (Name, Mail Address, and the like) may be displayed in the character string input screen P2. Moreover, an input item that is selected as an input target item among the plurality of input items may be highlighted. Furthermore, a cursor that indicates the position at which characters are input may be displayed in the input item selected as an input target item.

Although a case where when it is judged in S158 that the character type that is not available for the selected input item 111 is included in the character string represented by the mobile phone character string information, an error message is displayed (S160) has been described, the present invention is not limited to this embodiment. Only characters that are available for the selected input item 111 may be extracted from the character string represented by the mobile phone character string information, and the extracted character string may be displayed in the character string display area A1.

Although a case where a random number is used as the item identification information has been described (S132), the present invention is not limited to such an embodiment. The item identification information may be allocated in advance to each input item.

Although an embodiment in which the input of the character string by the mobile phone 10 is confirmed when the "Confirm" button image is pressed (S227) has been described, the present invention is not limited to such an embodiment. For example, the input of the character string by the mobile phone 10 may be confirmed when the NFC communication 200 with the MFP 51 is established in S230 (that is, when the mobile phone 10 is held over the MFP 51). As a result, since the operation of confirming the input of a character string and the operation of executing communication can be integrated, it is possible to simplify the operations.

When it is judged in S156 that the OK button image B11 is not pressed (S156: NO), the flow may proceed to S146. In S146, the CPU 32 may judge whether an instruction to cancel the character string input operation is input. By doing so, when a character string is sent from the mobile phone 10, the user can be allowed to judge whether or not to confirm the input of the character string.

Although input items such as name, reading and pronunciation thereof, mail address, and telephone number have been illustrated as examples of the input item 111, the present invention is not limited to these examples. Other information (password or the like) may be used as the input item 111. Although an address book has been illustrated as an example of the information stored in the information storage area 35a, other information may be stored.

The standard character code system used for the MFP input character string information and the mobile phone character string information is not limited to Unicode, and other character code systems may be used.

Although an embodiment in which the NFC communication 200 is used for communicating various items of information between the MFP 51 and the mobile phone 10 has been described, the present invention is not limited to such an embodiment, and wireless LAN communications 201 and 203 may be used, for example.

Further, devices such as notebook-type PCs which have an NFC communication function may be used instead of the mobile phone 10. In this case, the character input application 28a and the communication application 28b may be various types of driver software that are installed in the notebook-type PC.

The MFP having the NFC tag is not limited to only one MFP 51, but a number of MFPs may have the NFC tag.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

A panel 39 is an example of "a display unit". A CPU executing S114 is an example of "a display control module". A CPU executing S118 is an example of "an input module". A mobile phone 10 is an example of "an information processing terminal". A NFC tag 46 is an example of "a communication module". An MFP 51 is an example of "an image processing device". A character type group 112 is an example of "character type group information".

What is claimed is:

1. An image processing device comprising:
a display;
a communication interface configured to execute communication;
a user interface configured to accept an input by a user;
a processor comprising hardware; and
a memory storing computer-readable instructions therein, the computer-readable instructions, when executed by the processor comprising hardware, causing the image processing device to perform:
displaying a character string input screen on the display, the character string input screen corresponding to at least one input item among a plurality of input items;
accepting, via the user interface, an input of at least one character inputted to the input item corresponding to the character string input screen displayed on the display;

displaying the at least one inputted character in the character string input screen;
sending item identification information and input character string information to
an information processing terminal via the communication interface,
the item identification information identifying the input item corresponding to the character string input screen that is displayed on the display, and
the input character string information identifying the at least one input character,
receiving the item identification information and character string information from the information processing terminal via the communication interface, the character string information indicating the at least one inputted character and a character string that is added to the at least one inputted character in the information processing terminal; and
displaying the at least one inputted character and the added character string based on the character string information in the character string input screen that corresponds to the input item identified by the item identification information, in a case where the item identification information and the character string information are received.

2. The image processing device as in claim 1, wherein
the item identification information identifies the input item corresponding to the character string input screen that is displayed on the display at a time-point when a communication with the information processing terminal is started.

3. The image processing device as in claim 1, wherein
each of the plurality of input items corresponds to a corresponding one of a plurality of character type groups, each of the character type groups includes more than one type of character type among a plurality of character types, and wherein the computer-readable instructions, when executed by the processor comprising hardware, cause the image processing device to further perform:
sending character type group information to the information processing terminal, the character type group information indicating the character type group corresponding to the input item that corresponds to the character string input screen displayed on the display.

4. The image processing device as in claim 1, wherein
each of the plurality of input items corresponds to corresponding one of a plurality of character type groups, each of the character type groups includes more than one type of character type among a plurality of character types, and
the at least one inputted character and the added character string are displayed based on the character string information in the character string input screen, in a case where a character type of the character string indicated by the character string information received from the information processing terminal is included in the character type group corresponding to the input item that corresponds to the character string input screen displayed on the display.

5. The image processing device as in claim 1, wherein
an upper limit of number of characters is set to each of the plurality of input items, and wherein the computer-readable instructions, when executed by the processor comprising hardware, cause the image processing device to further perform sending
the upper limit to the information processing terminal.

6. The image processing device as in claim 1, wherein
the communication interface is configured to execute a communication with the information processing terminal by a near field communication of which communication available distance is within substantially one meter.

7. The image processing device as in claim 6, wherein
the communication interface is configured to execute a communication with the information processing terminal by using a communication standard that requires no authentication information.

8. The image processing device as in claim 1, wherein
the character string is displayed in the character string input screen based on the character string information, in a case where the input item indicated by the item identification information received by the communication interface is identical to the input item corresponding to the character string input screen displayed on the display, and
the character string is not displayed in the character string input screen based on the character string information, in a case where the input item indicated by the item identification information received by the communication interface is not identical to the input item corresponding to the character string input screen displayed on the display.

9. The image processing device as in claim 1, wherein
a size of the display is smaller than a size of a display provided in the information processing terminal.

10. A non-transitory computer-readable storage medium storing computer-readable instructions for an information processing terminal comprising a communication interface, a display, a user interface, a processor comprising hardware, and a memory executed by the processor comprising hardware, cause the processor comprising hardware to perform:
receiving item identification information and input character string information via the communication interface from an image processing device, the item identification information identifying an input item corresponding to a character string input screen that is displayed on a display of the image processing device, and the input character string information identifying at least one inputted character inputted to the character string input screen of the image processing device;
displaying a character string input screen based on the received item identification information and the at least one inputted character identified in the received input character string information in a corresponding input item of the character string input screen;
accepting, via the user interface, an input of a character string that is added to the at least one inputted character;
displaying the at least one inputted character and the added character string in the corresponding input item of the character string input screen; and
sending the item identification information and character string information to the image processing device, the character string information indicating the at least one inputted character and the added character string.

11. An image processing system including an image processing device and an information processing terminal, the image processing device and the information processing terminal being configured to connect with each other so as to communicate with each other,
the image processing device comprising:
a first display;

a first user interface;
a first communication interface configured to communicate with the information processing terminal,
a first processor comprising hardware; and
a first memory storing first computer-readable instructions therein,
the information processing terminal comprising:
a second display;
a second user interface configured to accept an input of a character string;
a second communication interface configured to communicate with the image processing device;
a second processor comprising hardware, and
a second memory storing second computer-readable instructions therein,
wherein when executed by the first processor comprising hardware, the first computer-readable instructions causing the image processing device to perform;
displaying a character string input screen on the first display, the character string input screen corresponding to at least one input item among a plurality of input items;
accepting, via the first user interface, an input of at least one character inputted to the input item corresponding to the character string input screen displayed on the first display;
displaying the at least one inputted character in the character string input screen;
sending item identification information and input character string information to the information processing terminal via the first communication interface, the item identification information identifying the input item corresponding to the character string input screen that is displayed in the first display, and the input character string information identifying the at least one inputted character;
wherein when executed by the second processor comprising hardware, the second computer-readable instructions cause the information processing terminal to perform:
receiving the item identification information and the input character string information via the second communication interface from the image processing device;
displaying a character string input screen based on the received item identification information and the at least one inputted character in the received input character string information in a corresponding input item of the character string input screen;
accepting, via the second user interface, an input of a character string that is added to the at least one inputted character;
displaying the at least one inputted character and the added character string in the corresponding input item of the character string input screen displayed on the second display; and
sending the item identification information and character string information to the image processing device via the second communication interface, and
wherein when executed by the first processor comprising hardware, the first computer-readable instructions further cause the image processing device to perform:
receiving the item identification information and the character string information from the information processing terminal via the first communication interface, the character string information indicating the at least one inputted character and the added character string that is added in the information processing terminal; and
displaying the at least one inputted character and the added character string based on the character string information in the character string input screen that corresponds to the input item identified by the received item identification information, in a case where the item identification information and the character string information are received.

* * * * *

UNITED STATES PATENT AND TRADEMARK OFFICE
CERTIFICATE OF CORRECTION

PATENT NO.         : 9,552,086 B2
APPLICATION NO.    : 13/851532
DATED              : January 24, 2017
INVENTOR(S)        : Keitaro Tomono It is certified that error appears in the above-identified patent and that said Letters Patent is hereby corrected as shown below:

In the Claims

Column 18, Claim 10, Line 34 should read: and a memory storing said computer-readable instructions, said computer-readable instructions, which when executed by the processor comprising hard- Column 19, Claim 11, Line 34 should read: is displayed on the first display, and the input character Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*